(12) United States Patent  
Gorman et al.

(10) Patent No.: US 7,587,958 B2
(45) Date of Patent: Sep. 15, 2009

(54) DE-CEL DAMPENER METHOD AND APPARATUS

(75) Inventors: Patrick Gorman, Bradenton, FL (US); Chris Bortolon, Commerce Township, MI (US)

(73) Assignee: Teleflex Incorporated, Limerick, PA (US)

( * ) Notice: Subject to any disclaimer, the term of this patent is extended or adjusted under 35 U.S.C. 154(b) by 115 days.

(21) Appl. No.: 11/868,276

(22) Filed: Oct. 5, 2007

(65) Prior Publication Data

US 2008/0083294 A1 Apr. 10, 2008

Related U.S. Application Data

(60) Provisional application No. 60/849,462, filed on Oct. 5, 2006.

(51) Int. Cl.
*B60K 20/00* (2006.01)

(52) U.S. Cl. .................. 74/473.25; 74/473.26; 74/473.1
(58) Field of Classification Search .............. 74/473.25, 74/473.26, 473.28, 473.1, 469
See application file for complete search history.

(56) References Cited

U.S. PATENT DOCUMENTS

| | | | |
|---|---|---|---|
| 2004/0053743 A1* | 3/2004 | Tsuzuki et al. | 477/97 |
| 2007/0137362 A1* | 6/2007 | Kortge et al. | 74/473.18 |
| 2008/0163713 A1* | 7/2008 | Hessler | 74/473.3 |

* cited by examiner

*Primary Examiner*—David M Fenstermacher
(74) *Attorney, Agent, or Firm*—Baker & Hostetler LLP

(57) ABSTRACT

A motor vehicle gear shift assembly includes a dampening device and a detent structure. The dampening device includes a body structure made of a resilient material, a mounting structure for securing it to structure of the gear shift assembly, and a flexible dampening surface. The flexible dampening surface of the dampening device flexes to decelerate and stop the movement of the detent structure.

15 Claims, 7 Drawing Sheets

DE-CEL DAMPENER METHOD AND APPARATUS

CROSS-REFERENCE TO RELATED APPLICATIONS

The present application is a non-provisional application of U.S. patent application Ser. No. 60/849,462 filed Oct. 5, 2006, the contents of which is incorporated herein by reference in its entirety.

FIELD OF THE INVENTION

The present invention relates generally to motor vehicles. More particularly, the present invention relates to motor vehicle gear shift assemblies.

BACKGROUND OF THE INVENTION

A motor vehicle often includes a gear shift assembly which enables a vehicle operator to control the transmission of the vehicle and to take the vehicle in and out of gear. The control positions provided by a gear shift assembly for a vehicle typically include park, reverse, neutral, drive, and low, which positions are often designated, respectively, by the letters P, R, N, D and L. The total number of gear shift positions may vary from vehicle to vehicle. In some vehicles there may be a range of low gears which are typically designated by the letter "L" followed by a number, for example L3, L2, L1. Some vehicle do not provide the driver with a low gear control setting. A gear shift assembly is operable to change gear positions and to maintain the selected gear position until the operator changes gears. Operation of the shift assembly may involve movement of vehicle components which can result in unwanted noise and wear on the components.

SUMMARY OF THE INVENTION

The foregoing needs are met, to a great extent, by a gear shift assembly comprising a frame member configured to be secured to a vehicle and having a plurality of gate structures defining a range of gear positions. A yoke is movably connected to the frame for movement through the range of gear positions. An actuation assembly is mounted to the yoke. The actuation assembly comprises an actuation member movable between a holding position and a releasing position and a detent structure movable between a gear holding position and a gear releasing position. The actuation member is operatively coupled to the detent structure so that movement of the actuation member from the holding position thereof to the releasing position thereof moves the detent structure from the gear holding position thereof to the gear releasing position thereof and movement of the actuation member from the releasing position thereof to the holding position thereof allows movement of the detent structure from the gear releasing position thereof into the gear holding position thereof. The frame member, the yoke and the detent structure are constructed and arranged such that when the detent structure is in the gear releasing position thereof the yoke is movable through the range of gear positions and such that when the detent structure is in the gear holding position thereof, the detent structure is engaged with one of the gate structures and the yoke is releasably held in a gear position with respect to the frame member. A dampening element is constructed of a resilient material and has a dampening surface positioned such that as the detent structure moves toward the gear holding position thereof, engagement of the detent structure with the dampening surface decelerates movement of the detent structure to dampen sound associated with the movement.

In some embodiments of the invention, a dampening device for dampening sound generated by movement of a detent structure of a vehicle gear shift assembly toward and into a gate structure formed on a frame of the gear shift assembly comprises a body structure comprised of a resilient material. A mounting structure integrally formed on the body structure is configured to be secured to structure within the gear shift assembly. A flexible dampening surface is integrally formed on the body structure. The body structure is constructed and arranged such that when the mounting structure thereof is secured to structure within the gear shift assembly, the dampening surface is positioned with respect to the gate structure so that the detent structure impacts the dampening surface as the detent structure moves toward the gate structure and so that flexure of the dampening surface decelerates and stops the movement of the detent.

In some embodiments of the invention, a method for dampening sound generated by movement of a detent structure of a vehicle gear shift assembly toward and into a gate structure formed in a frame of the gear shift assembly, comprises: decelerating the detent structure by moving the detent structure into engagement with a dampening surface of a dampening element; and stopping the detent pin with said dampening surface of said dampening element.

In some embodiments of the invention, a gear shift assembly comprises a frame member configured to be secured to a vehicle and has a plurality of gate structures defining a range of gear positions. A shifting mechanism is movably mounted within the frame for movement through the range of gear positions. The shifting mechanism comprises an actuation member movable between a holding position and a releasing position, and a detent structure movable between a gear holding position and a gear releasing position. The actuation member is operatively coupled to the detent structure so that movement of the actuation member from the locking position thereof to the releasing position thereof moves the detent structure from the gear holding position thereof to the gear releasing position thereof and movement of the actuation member from the releasing position to the holding position thereof allows movement of the detent structure from the gear releasing position into the gear holding position thereof. The frame member and the shifting mechanism is constructed and arranged such that when the detent structure is in the gear releasing position thereof the shifting mechanism is movable through the range of gear positions and such that when the detent structure is in the gear holding position thereof, the detent structure is engaged with one of the gate structures and the shifting mechanism is releasably held in a gear position with respect to the frame member. A dampening means is constructed and arranged such that as the detent structure moves toward the gear holding position thereof, engagement of the detent structure with the dampening means decelerates and stops movement of the detent structure to dampen sound associated with the movement.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
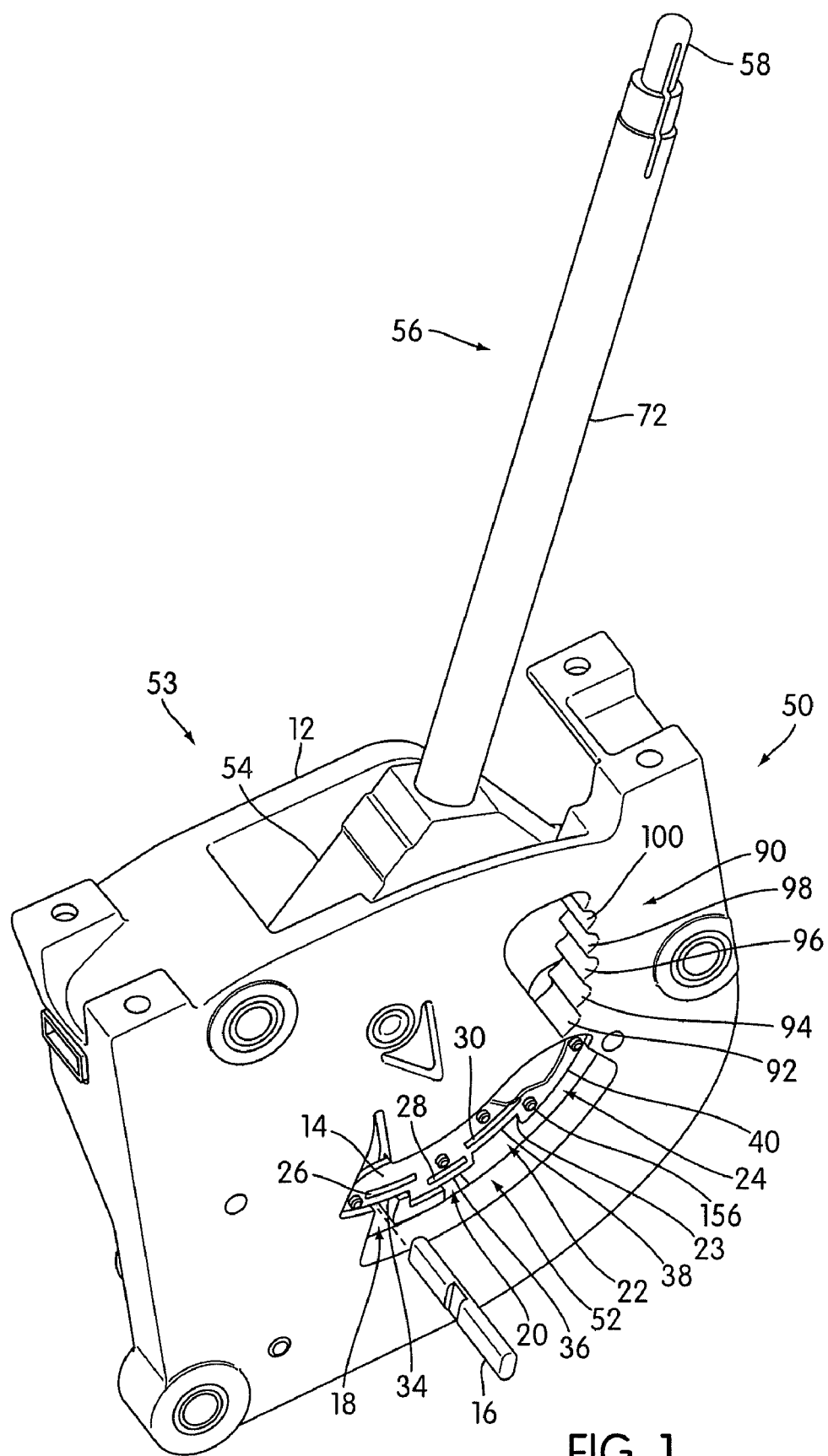
FIG. 1 is a partially exploded perspective view of a gear shift assembly showing a first embodiment of a dampening element and a detent structure in exploded relation to the assembly generally.

The invention will now be described with reference to the drawing figures, in which like numerals refer to like parts throughout. FIG. 1 shows an example of a gear shift assembly 50 constructed according to principles of the invention. Generally, the gear shift assembly 50 includes a frame member 12 configured to be secured to a vehicle and having a plurality of gate structures, generally designated 52. The gate structures 52 include gates 18, 20, 22, 24 which define a range of gear positions (shown in FIG. 6). The location of each gear position is indicated by an imaginary axis in FIG. 6. The gear positions include a park position P, a reverse position R, a neutral position N, a drive position D, and a three low gear positions L3, L2, L1. A yoke 54 is movably connected to the frame 12 for movement through the range of gear positions.

An actuation assembly 56 is mounted to the yoke 54. The actuation assembly 56 includes an actuation member 58 and a detent structure 16. The actuation member 58 is movable between a holding position (shown in FIG. 5, for example), and a releasing position (shown in FIG. 6 for example). The detent structure 16 is movable between a gear holding position (within one of the gates 18, 20, 22, 24 in the present example) and a gear releasing (i.e., gear changing) position (shown in phantom in FIG. 6). The actuation member 58 is operatively coupled to the detent structure 16 so that movement of the actuation member 58 from the holding position thereof to the releasing position thereof moves the detent structure 16 from the gear holding position thereof to the gear releasing position thereof and movement of the actuation member 58 from its releasing position into its holding position allows the detent structure 16 to move from its gear releasing position into its gear holding position.

The frame member 12, the yoke 54 and the detent structure 16 are constructed and arranged such that when the detent structure 16 is in its gear releasing position, the yoke 54 is movable through the range of gear positions P, R, N, D, L3, L2, L1 (shown in FIG. 6), and such that when the detent structure 16 is in its gear holding position, the detent structure 16 is engaged with one of the gates 18, 20, 22, 24, and the yoke 54 is releasably held in a selected gear position with respect to the frame member 12.

The gear shift assembly 50 includes an example of a dampening element 14 (FIG. 6, for example) to reduce noise associated with operation of the assembly 50. The dampening element 14 may be constructed of a resilient material and have dampening surfaces 34, 36, 38, 40 such that as the detent structure 16 moves toward a gear holding position within a respective one of the gates 18, 20, 22, 24 engagement of the detent structure 16 with the dampening surface 34, 36, 38, 40 decelerates movement of the detent structure 16 into the gear holding position thereof to dampen sound associated with the movement.

Figure 2:
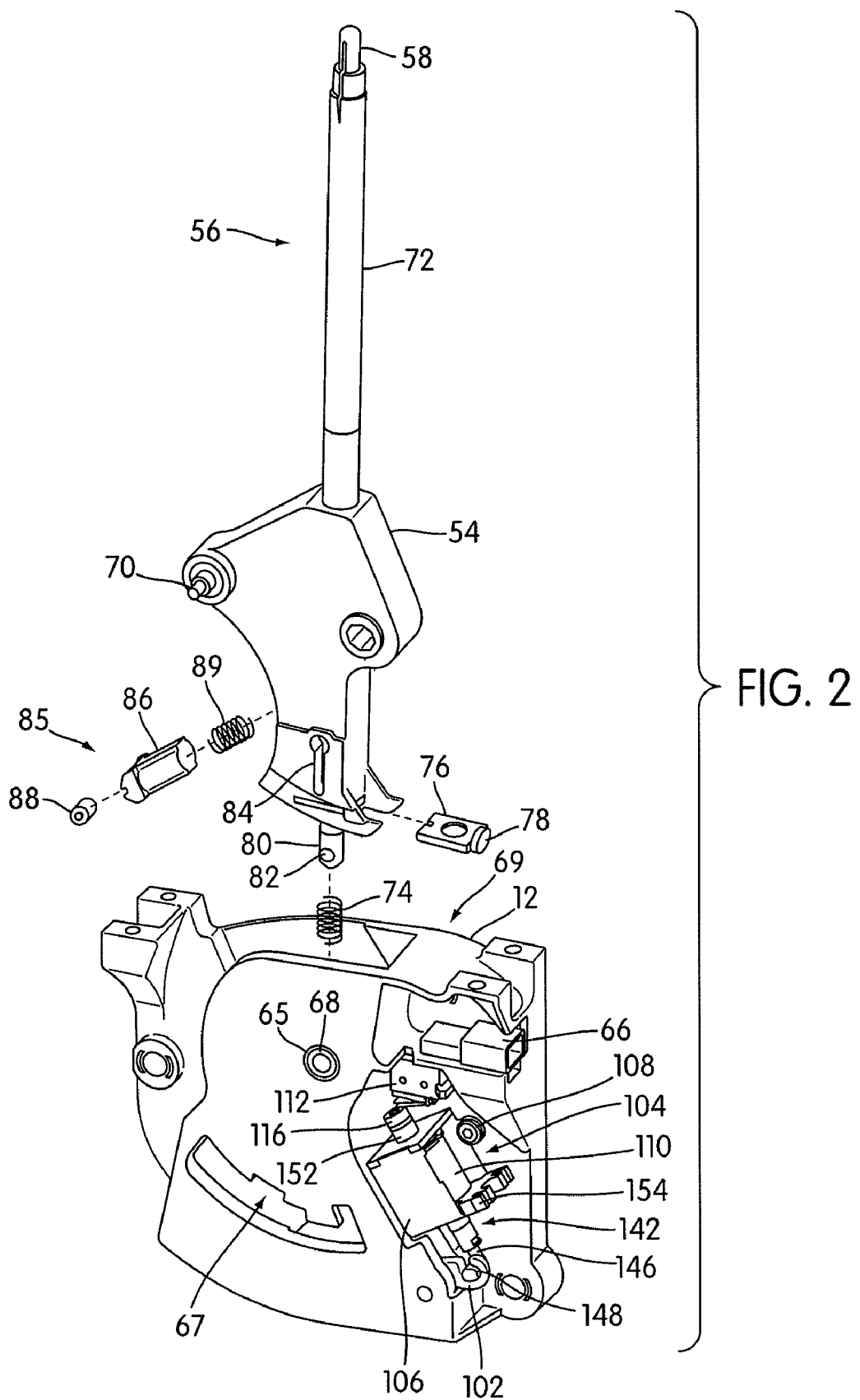
FIG. 2 is another partially exploded perspective view of the gear shift assembly shown in FIG. 1.

Details of the structure and operation of the example embodiment of the gear shift assembly 50 are illustrated in several of the figures. Referring to FIGS. 1 and 2, for example, the yoke 54 and the actuation assembly 56 form a shifting mechanism. The frame 12, the yoke 54 and the actuation member 58 may each be an integral structure and each may be constructed of metal, a plastic such as polypropylene, a glass-filled nylon or any other material of sufficient strength. The frame 12 may be provided with ribbed structures (not shown) to enhance its strength and rigidity. A gate structure 52, 53 is formed in each side of the frame 12, although this is not required. Preferably, however, the gate structures 52 are formed on both sides of the frame 12 for enhanced strength of the gear shift assembly 50. More specifically, because the detent structure 16 engages both sides of the frame 12, the yoke 54 and the actuation assembly are more securely mounted to the frame 12. The frame 12 includes a detent path 90 which engages a detent mechanism, and includes a pair of aligned openings 67, 69.

Figure 3:
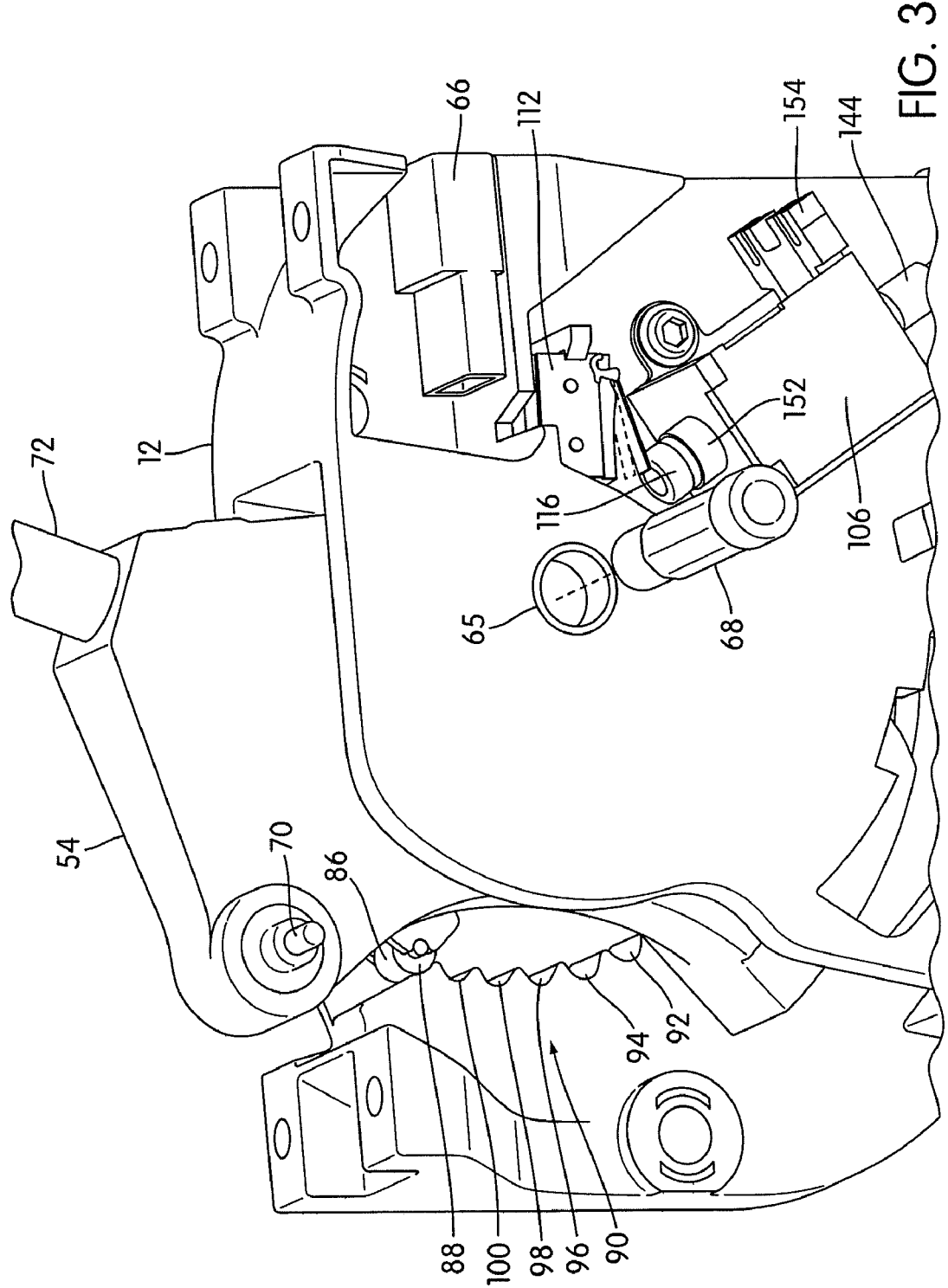
FIG. 3 is a fragmentary perspective view of the gear shift assembly shown in FIG. 2 showing a pivot pin in exploded relation to the gear shift assembly and a switch in an on and off position with the off position drawn in phantom lines.

As shown in FIGS. 2 and 3, the yoke 54 is supported for pivotal movement within the frame 12 by a main pivot pin 68 which engages bushings 65 mounted within openings 67, 69. A cable pin 70 preferably made of steel is mounted within the yoke 54. A cable (not shown) may be connected between the pin 70 and a vehicle transmission so that movement of the yoke 54 operates the vehicle transmission. A roller assembly 85 is mounted within the yoke 54, and includes a roller holder 86, a roller 88 rotatably mounted in the roller holder 86 and a spring 89. The roller 88 is biased into engagement with the detent path 90 by spring 89. As the roller 88 rolls along detent path 90, the roller assembly 85 releasably holds the roller 88 in positions or recesses 92, 94, 96, 98, 100 which generally correspond to gear positions P, R, N, D, L3, L2, L1. The number of recesses correspond to the number of gear positions available in a particular vehicle. The detent path 90 helps a vehicle operator control the distance that the yoke 54 travels as the operator shifts from one gear to another.

The actuation assembly 56 includes a tubular housing 72 which is mounted to the yoke 54. The actuation member 58 is movably disposed within the tubular housing 72 and a detent structure 16 is rigidly secured to the actuation member 58. The end portions of the detent structure 16 extend out openings 67, 69 in opposite sides of the yoke 54. The actuation member 58 may be formed of glass-filled nylon or any other suitable material including polypropylene. The housing is preferably made of steel.

A portion of the actuation member 58 is housed within the yoke 54. The actuation member 58 is spring loaded by the compression spring 74 so that the actuation member 58 is spring biased in a direction that moves the detent structure 16 into engagement with the gate structure 52. For example, in the instance in which the gear assembly is in park P, the detent structure 16 is urged upward by the compression spring 74 in slot 84 into a holding position (shown in FIG. 5). When the actuation member 58 is in a releasing position, the detent structure is urged downward along the slot 84. The compression spring 74 bottoms out on the plug 76 which is slidably engaged with yoke 54 to keep the actuation member 58 housed within the yoke 54. The plug 76 is integrally formed with a bumper 78. The bumper 78 is preferably formed of Hytrel®, a thermoplastic polyester elastomer made by DuPont, or any other suitable elastomeric material so that when a vehicle is shifted into park, and the bumper 78 hits a stopper, not shown, molded into an interior of the frame 12, the sound of this contact is dampened. The actuation member has molded thereto a metal slug 80 defining an opening 82 therein for receiving the detent structure 16.

Figure 4:
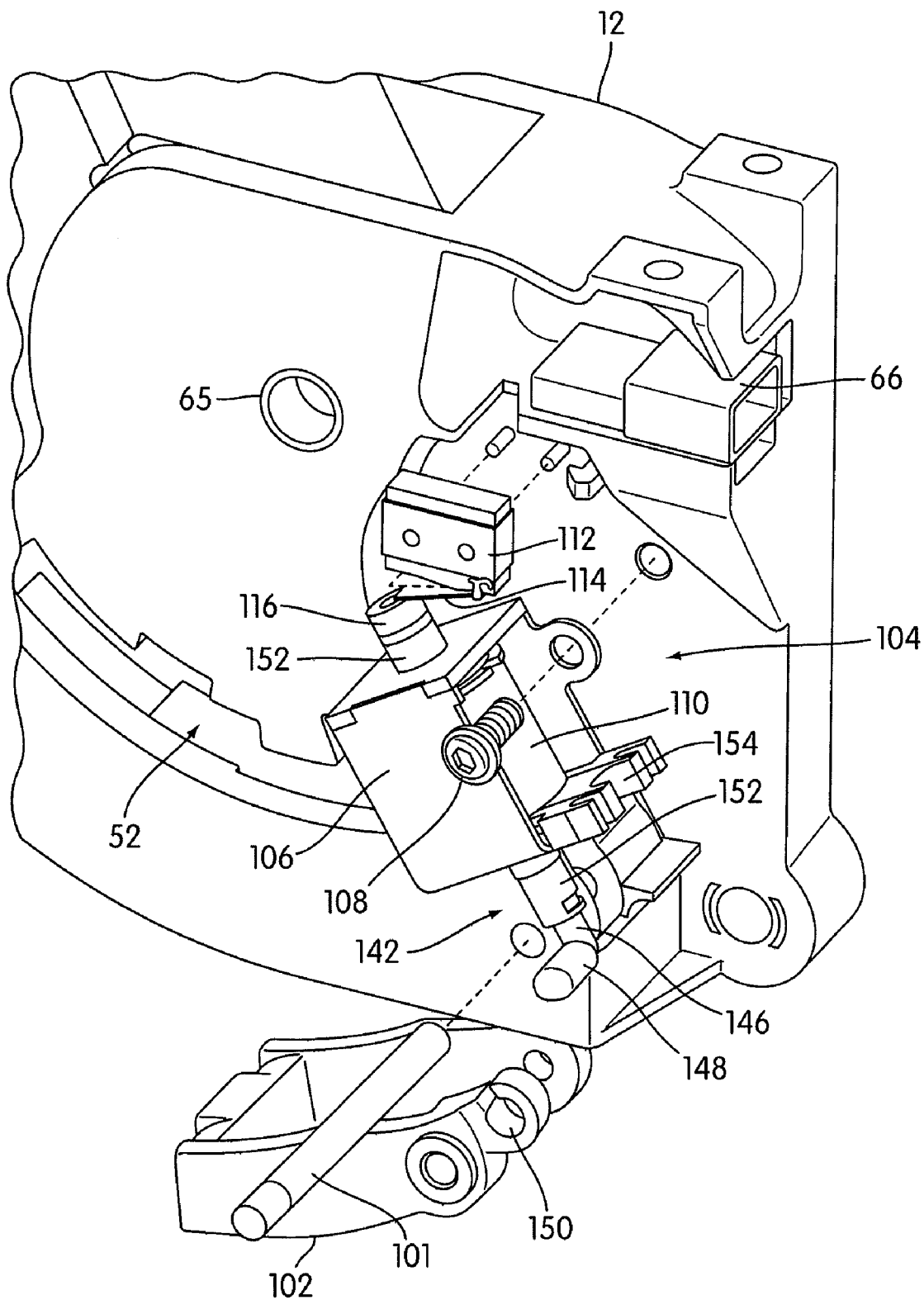
FIG. 4 is fragmentary perspective view of a frame of the gear shift assembly and showing other components of the assembly in exploded relation with the frame and a connector mounted in the frame.

As shown in FIG. 4, a lock lever 102 may be provided to mechanically lock the yoke 54 in park until certain conditions are met. The lock lever 102 is a pivotally mounted to the frame 12 by a pin 101. The gear shift assembly 50 can be moved out of park only when the lock lever 102 is in its open or releasing position. Conversely, when the lock lever 102 is in its closed or locking position, the lever moves back up to lock the gear shift assembly 50 in park.

Movement of the lock lever 102 is controlled by the solenoid assembly 104. The electrical components of the gear shift assembly 50 connect to vehicle electrical power and control systems through the female connector 66. The solenoid assembly 104 includes a housing 106 secured to the frame by a screw 108. The solenoid 110 in turn is actuated by contacting a leg 114 of a switch 112 (two positions of the leg are shown corresponding to an on and off position of the switch 112). When a key in the ignition switch of a vehicle is turned to the on position and a foot is placed on a brake pedal, a leg 114 of the switch 112 contacts a tab 116 of a mechanical member 142 of the solenoid 110 (shown in FIG. 4).

As the solenoid 110 is turned on, the mechanical member 142 lifts and lowers by electromechanical force. The mechanical member 142 includes a rod portion 144 made of metal molded to an engaging portion 146 preferably made of plastic on one end of the mechanical member 142, and tab 116 on the other end. The engaging portion 146 is cushioned with a rubber sleeve 148 and engages an opening 150 defined in the lock lever 102. The engaging portion 146 is preferably football-shaped so that it does not slip out of engagement with the opening 150. The rubber sleeve 148 is provided to limit rattling of the engaging portion 146 when engaged in the opening 150 of the lock lever 102. As the mechanical member 142 lifts, the lock lever 102 is pulled into an open position releasing the yoke 54 and allowing the vehicle to move out of park. When power to a vehicle is cut off, the switch 112 closes and disengages the solenoid 110 which acts to lower the mechanical member 142. As the mechanical member 142 lowers, the lock lever 102 is pushed up locking the vehicle in park. Wires (not shown) connect to the steel portion 152 near tab 116, the wire connector 154 of the solenoid assembly 104 and the switch 112 to connector 66, which as noted earlier connects to vehicle electronics.

Figure 5:
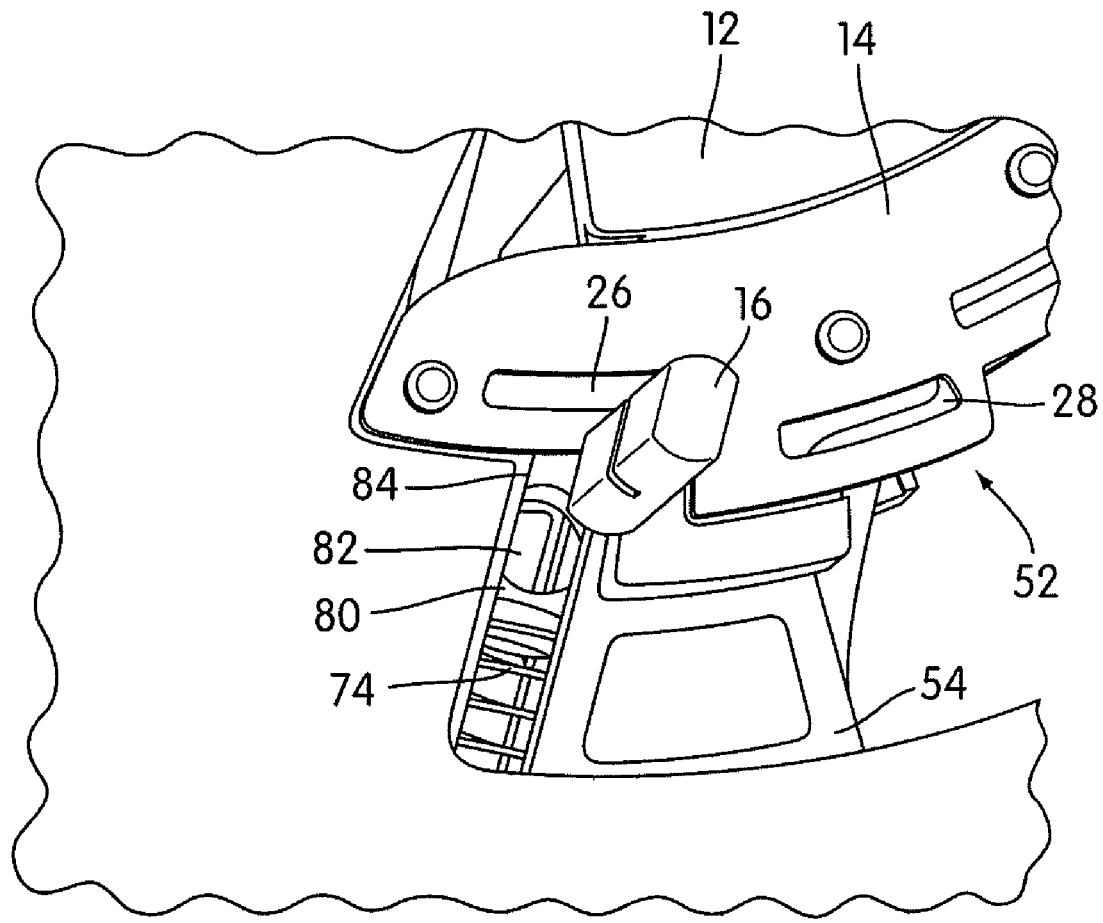
FIG. 5 is another fragmentary perspective view showing a detent structure in exploded relation with a portion of an actuation assembly.
Figure 6:
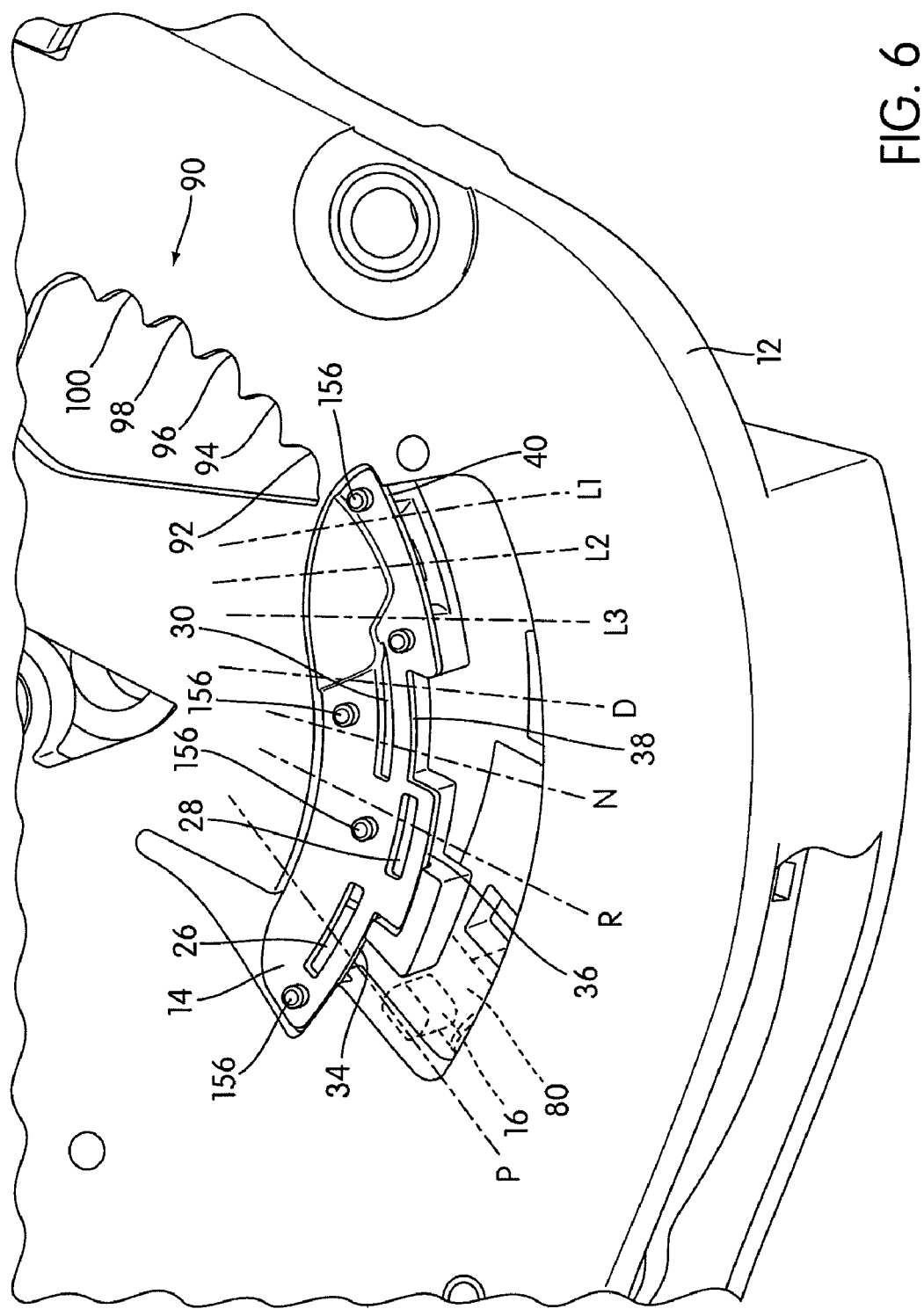
FIG. 6 is another fragmentary perspective view of a portion of the frame showing a releasing position of the actuator assembly drawn in phantom lines, and gear positions P, R, N, D, L3, L2, L1.

As shown in FIGS. 5 and 6, the dampening element 14 is secured to the frame 12 in a position to engage and cushion the detent structure 16 as it moves into one of the gate structures 52 of the frame 12. The example dampening element 14 is a dampening means. The dampening element 14 is provided with integrally formed mounting structure on its body and is constructed and arranged to be secured to structure within the gear shift assembly 50. Optionally, the dampening element 14 may be provided with no mounting structure and instead the dampening element 14 may be configured with a flat surface adapted to receive an adhesive or may be secured in any suitable manner in accordance with the principles of the invention. The dampening element 14 is provided with three openings or closed loops 26, 28, 30 (shown in FIG. 1) located above the gear positions P, R, N, D (one longer opening is provided above the neutral N and drive D gear positions). The dampening element 14 is provided with a flexible leg 23 to provide flexible engagement with the detent structure 16. These structures 23, 26, 28, 30 are not required and the location, size and structure of each may vary depending on the construction of and the operating characteristics of the vehicle in which they are included. The openings can be a hollow space defined in an interior of the dampening element 14, or optionally the openings could be replaced with a structure formed of one material having different elastomeric properties than the material used to form the remainder of the dampening element 14. The dampening element 14 in the example embodiment extends outwardly from the gate structures 52 and is positioned so that as the detent structure 16 moves along the gear positions R, N, D it does not contact the gate structures 52. In the present example being used to illustrate the use of the dampening element 14, the dampening element 14 extends outwardly about 1 mil past the gate structures 52. This is not required, however, and the dampening element 14 may be mounted in many other ways and positions to decelerate movement of the detent structure 16. The dampening element 14 may be heat staked to the frame 12 with round studs 156 as shown in FIG. 6. Any other suitable method of securing the dampening element 14 within the gear shift assembly 50 including to the frame 12 may be used in accordance with the invention including, for example, using an adhesive (e.g., gluing), using fasteners (e.g., bolting, screwing or riveting) or a combination thereof. The studs 156 may be integrally formed as part of the frame 12. The studs 156 may be round, as in this example, but this is not required. The size and shape of the studs 156 may vary depending on the construction of the dampening element 14 or the need to design around other parts of the gear shift assembly 50. The studs 156 may be placed in other suitable locations other than those shown in the example of FIG. 6. In the present example, the flexing openings or closed loops are located close to the locations where the detent structure 16 impacts the dampening element 14 and the studs 156 are located close to the flexing openings or closed loops but not over them to maintain the position of the dampening element 14 with respect to the frame 12 during impact.

The movement of the detent structure 16 is slowed and cushioned by the dampening element 14. As the detent structure 16 moves into a gear position P, R, N, D, L3, L2, L1, the openings 26, 28, 30 facilitate flexing movement of the dampening surfaces 34, 36, 38, 40. The loops or openings are not required, however, their size, shape and location may vary. The loops or openings may be provided in some gear positions and not others, depending on many factors including the material selected to construct a dampening element, the size and shape of a dampening element, the manner in which a dampening element is mounted within a gear shift assembly and the movement of a detent structure in a particular gear position and in a particular application. The flexing of the dampening element 14 decelerates the momentum of the detent structure 16 as the spring 74 urges the detent structure 16 into a gear holding position. The action of the dampening element 14 slows the speed of the detent structure 16 sufficiently to prevent the detent structure 16 from moving into contact with the gate structures 52 on the frame 12. A dampening element 14 may be constructed to prevent contact between the detent structure 16 and other structures of the gear shift assembly or to facilitate movement of the detent structure 16 into contact and engagement with other structures of the gear shift assembly including in the present example, portions of the frame 12. The dampening element 14 quiets this noise associated with movement of the detent structure 16 within in the gear shift assembly 50. The dampening element 14 also serves to limit shaking of the spring 60 and the actuation member 58 that would otherwise occur when the detent structure 16 makes a hard stop against the gate structures 52. Preferably, the dampening structure 16 is formed of Hytrel®, or any other suitable resilient material.

Figure 7:
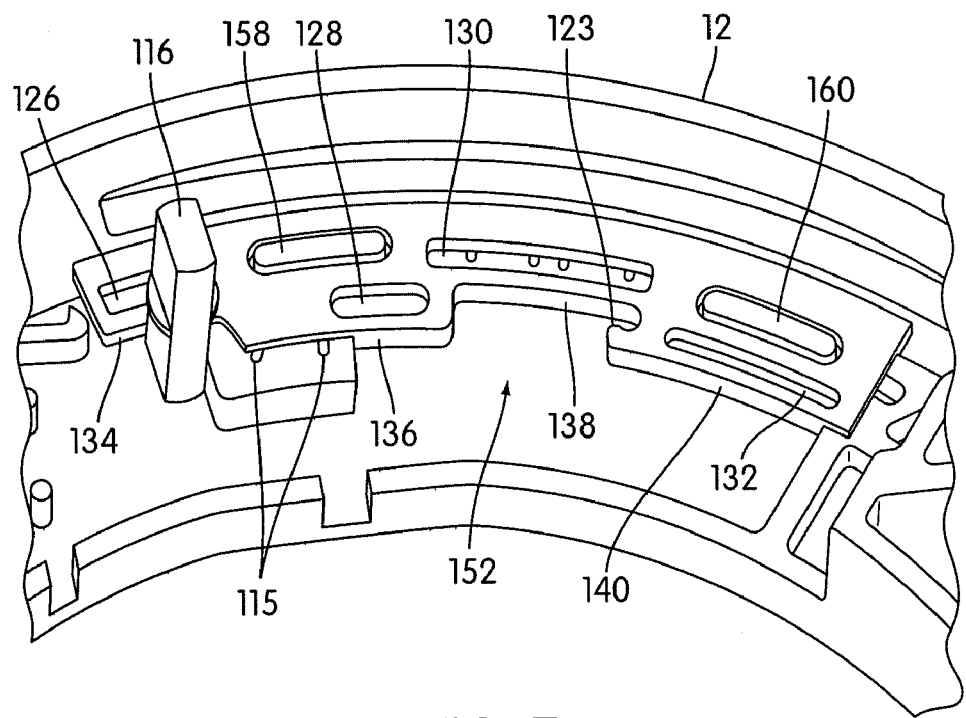
FIG. 7 is a perspective view of another frame and another dampening element with another detent structure showing the detent structure in a holding position at the park P gear position according to a second embodiment.

Another example embodiment is shown in FIG. 7. In FIG. 7, the dampening element 114 is secured to the frame 112 in a position to engage, decelerate and cushion the detent structure 116 as it moves toward one of the gate structures 152 of the frame 112. The example dampening element 114 is a dampening means. The dampening element 114 is provided with integrally formed mounting structure 115 on its body and is constructed and arranged to be secured to structure within the gear shift assembly 50. Optionally, there may be provided no mounting structure and instead the dampening element 114 may be configured with a flat surface adapted to receive an adhesive or may be secured in any suitable manner in accordance with the principles of the invention. The dampening element 114 is provided with four openings or closed loops 126, 128, 130, 132 located above the shifter positions P, R, N, D, L3, L2, L1. A protruding flexible leg 123 is formed on the dampening element 114 to provide flexible engagement with the detent structure 116. As the detent structure 116 moves into a gear position P, R, N, D, L3, L2, L1, the openings 126, 128, 130, 132 allow dampening surfaces 134, 136, 138, 140 to flex. This flexing decelerates the momentum of the detent structure 116, in a manner similar to the first example embodiment. In the example embodiment of FIG. 7, the dampening element 114 extends outwardly from the gate structures 152 so that the detent structure can be slid between some of the gear positions R, N, D without contacting the associated gate structures 152. Preferably, the dampening element 114 extends outwardly about 1 mil past the gate structures 152. The dampening element 114 may be heat staked to the frame 112 with elongated studs 158, 160 as shown in FIG. 7. Any other suitable method of securing the dampening element 114 to the frame 112 may be used in accordance with the invention including the methods described above with reference to the previous example embodiment. The elongated studs 158, 160 may be integrally formed as part of the frame 112. In the example embodiment, one of the studs 158 is adjacent the reverse gear position R, the other of the studs 160 is adjacent the low gear positions L3, L2, L1. The studs may be placed in other suitable locations other than those shown in FIG. 8. Preferably, the studs are located close to the flexing openings or closed loops, but not over them. The size and shape of the studs 158, 160 may vary depending on the construction of dampening element 114 or the need to design around other parts of the gear shift assembly 50.

Figure 8:
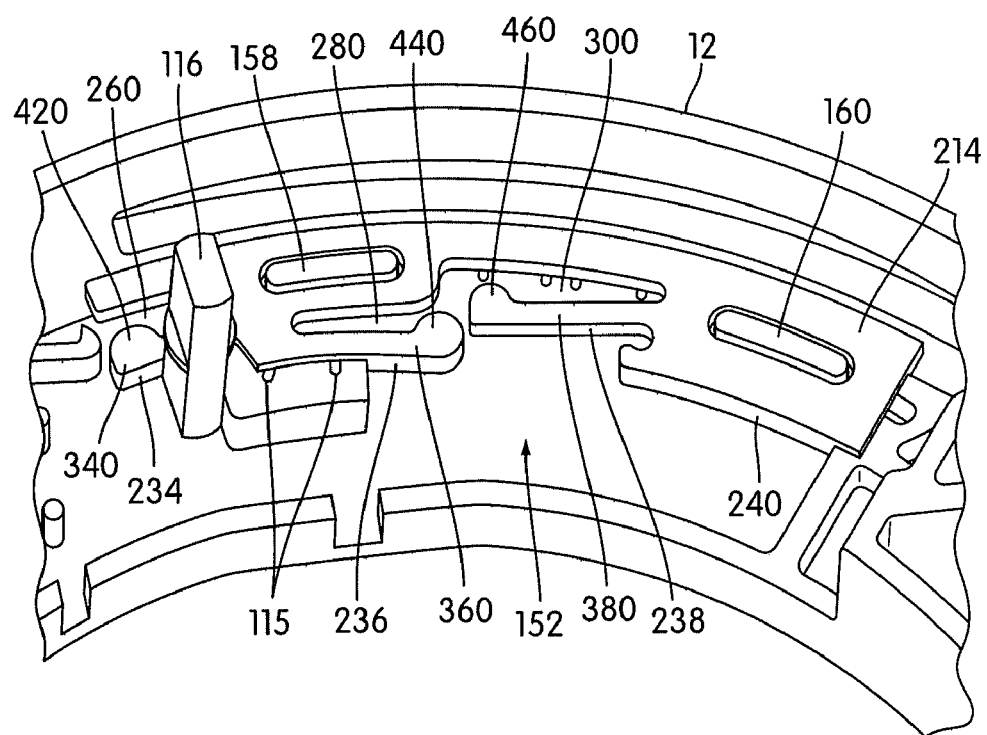
FIG. 8 is a perspective view of the frame and dampening element with detent structure shown in FIG. 7 showing the detent structure in a holding position at the park position P according to a third embodiment.

Yet another example embodiment is shown in FIG. 8. In FIG. 8, a dampening element 214 is secured to the frame 112 in a position to engage, decelerate and cushion the detent structure 116 as it moves toward one of the gate structures 152 of the frame 112. The example dampening element 214 is a dampening means. The example of a dampening element 214 is an integral structure which is shaped to form integral flexible, resilient legs 340, 360, 380 which are positioned to engage the detent structure 116 as it moves toward and into a holding position in the associated gate. The legs may optionally be provided with structures which modify the flexing behavior of the associated leg. In the example of FIG. 8 these structures are illustrated in the form of enlarged end portions or knobs 420, 440, 460. The dampening element 214 is also provided with openings 260, 280, 300 which increase the flexibility of the respective associated surface on the detent structure 116. More specifically, as the detent structure 116 moves into a gear position P, R, N, D, L3, L2, L1, the openings 260, 280, 300 increase the degree of flexibility of the associated the dampening surfaces 234, 236, 238, 240. This flexing decelerates the momentum of the detent structure 16, in a manner similar to the first and second example embodiments which cushions and quiets the operation of the detent structure 116 and associated parts.

In a manner similar to the above example embodiments, the dampening element 214 is constructed and positioned to facilitate, cushion and quiet sliding movement between the detent structure 116 and portions of the frame 112. More specifically, the dampening element 214 extends outwardly from the gate structures 52 so that as the detent structure 116 slides between or through the gear positions R, N, D it slides along the dampening element 214 without contacting the gate structures 152. As the detent structure 116 engages the enlarged end portions or knobs 420, 440, 460 of the dampening element 214 when it moves into a gear holding position, the enlarged end portions are pushed through the openings 260, 280, 300 into engagement with a portion of the dampening element 214. As the detent structure 116 is moved into a gear releasing position thereof, the detent structure 116 disengages from the enlarged end portions or knobs 420, 440, 460 and the enlarged end portions or knobs 420, 440, 460 move back through the openings 260, 280, 300 and disengage from the portion of the dampening element 214 that was contacted when the detent structure 116 was moved into the gear holding position thereof. The movement of the enlarged end portions or knobs 420, 440, 460 into and out of engagement with another portion of the dampening element 214 causes the dampening surfaces 234, 236, 238, 240 to flex. Preferably, the dampening element 214 extends outwardly about 1 mil past the gate structures 152. The dampening element 214 may be heat staked to the frame 12 with elongated studs 158, 160 as shown in FIG. 8. Any suitable method of securing the dampening element 214 to the frame 112 may be used in accordance with the invention including those described in connection with the other example embodiments. One of the studs 158 is adjacent the reverse gear position R and the other 160 is adjacent the low gear positions L3, L2, L1. The studs may be placed in other suitable locations other than those shown in FIG. 8.

It can be understood that the dampening elements described and illustrated herein are examples only. It is contemplated and within the scope of the disclosure to construct a wide range of dampening elements to meet particular design and dampening requirements in a wide range of applications. A variety of flexible, resilient materials could be used in the construction. The dimensions of a dampening element (e.g., the thickness of the overall structure) may vary depending on the nature of the particular application. For example, the thickness of a dampening element may be increased to increase the cushioning and damping effect of a particular dampening element or the thickness may be varied along the length of a particular dampening element to meet the dampening requirements of a particular application. Similarly, the number, size, shape and location of the openings may vary in other embodiments to meet the damping requirements of a particular vehicle. The number and locations of the points of attachment between a particular dampening element and an associated frame may vary. It can be understood that legs and/or openings may be provided in the size, shape, number and locations required to provide the degree of dampening sought in a particular application. Similarly, points of attachment may optionally be located and constructed to improve the dampening action of a particular dampening element.

What is claimed is:

1. A gear shift assembly, comprising:
a frame member configured to be secured to a vehicle and having a plurality of gate structures defining a range of gear positions;
a yoke movably connected to said frame for movement through said range of gear positions;
an actuation assembly mounted to said yoke, said actuation assembly comprising an actuation member movable between a holding position and a releasing position and a detent structure movable between a gear holding position and a gear releasing position, said actuation member being operatively coupled to said detent structure so that movement of said actuation member from the holding position thereof to the releasing position thereof moves said detent structure from the gear holding position thereof to the gear releasing position thereof and movement of the actuation member from the releasing position thereof to the locking position thereof allows movement of said detent structure from the gear releasing position thereof into the gear holding position thereof;
said frame member, said yoke and said detent structure being arranged such that when said detent structure is in the gear releasing position thereof said yoke is movable through the range of gear positions and such that when said detent structure is in the gear holding position thereof, said detent structure is engaged with one of said gate structures and said yoke is releasably held in a gear position with respect to said frame member; and
a dampening element constructed of a resilient material and having a dampening surface positioned such that as said detent structure moves toward the gear holding position thereof, engagement of said detent structure with said dampening surface decelerates movement of said detent structure to dampen sound associated with said movement.

2. The gear shift assembly according to claim 1, wherein said dampening element defines an opening adjacent said dampening surface to increase flexibility of said surface.

3. The gear shift assembly according to claim 2, wherein the opening defined by said dampening element defines a closed loop.

4. The gear shift assembly according to claim 3, wherein said closed loop is arranged adjacent to one or more of said gear positions.

5. The gear shift assembly according to claim 2, wherein the opening defined by said dampening element defines a flexible leg and wherein said dampening surface is disposed on said leg so that flexure of said leg decelerates said detent structure.

6. The gear shift assembly according to claim 5, wherein said leg includes a knob structure.

7. The gear shift assembly according to claim 1, wherein the dampening element is formed of a thermoplastic polyester elastomer.

8. The gear shift assembly according to claim 1, further comprising:
a mounting structure integrally formed on said dampening element configured to be secured to structure within the gear shift assembly; and
a flexible dampening surface integrally formed on said dampening element, said dampening element being constructed and arranged such that when said mounting structure thereof is secured to structure within the gear shift assembly, said dampening surface is positioned with respect to the gate structure so that the detent structure impacts said dampening surface as the detent structure moves toward the gate structure and so that flexure of said dampening surface decelerates and stops the movement of the detent.

9. The gear shift assembly according to claim 5, wherein said leg includes a knob structure.

10. A method for dampening sound generated by movement of a detent structure of a vehicle gear shift assembly toward and into a gate structure formed in a frame of the gear shift assembly, comprising:
placing the actuation member in a releasing position thereby urging the detent structure down into a gear releasing position;
pivotally moving a yoke within a frame thereby shifting to a desired gear;
placing the actuation member in a holding position thereby moving the detent structure up into a gear holding position;
decelerating the detent structure by moving the detent structure into engagement with a dampening surface of a dampening element; and
stopping the detent structure with said dampening surface of said dampening element, wherein said stopping further comprises flexing said dampening surface when said detent structure engages said dampening surface.

11. The method according to claim 10, wherein said decelerating further comprises moving the detent structure into engagement with a flexible leg of said dampening element wherein said dampening surface is disposed on said leg so that flexure of said leg decelerates said detent structure.

12. The method according to claim 11, wherein said stopping further comprises flexing said flexible leg so that flexure of said flexible leg stops the movement of the detent structure.

13. A gear shift assembly, comprising:
a frame member configured to be secured to a vehicle and having a plurality of gate structures defining a range of gear positions;
a shifting mechanism movably mounted within said frame for movement through said range of gear positions, said shifting mechanism comprising an actuation member movable between a holding position and a releasing position and a detent structure movable between a gear holding position and a gear releasing position, said actuation member being operatively coupled to said detent structure so that movement of said actuation member from the locking position thereof to the releasing position thereof moves said detent structure from the gear holding position thereof to the gear releasing position thereof and movement of the actuation member from the releasing position thereof to the holding position thereof allows movement of said detent structure from the gear releasing position thereof into the gear holding position thereof;

said frame member and said shifting mechanism being constructed and arranged such that when said detent structure is in the gear releasing position thereof said shifting mechanism is movable through the range of gear positions and such that when said detent structure is in the gear holding position thereof, said detent structure is engaged with one of said gate structures and said shifting mechanism is releasably held in a gear position with respect to said frame member; and dampening means constructed and arranged such that as said detent structure moves toward the gear holding position thereof, engagement of said detent structure with said dampening means decelerates and stops movement of said detent structure to dampen sound associated with said movement.

14. The gear shift assembly according to claim 13, wherein said dampening means includes a dampening surface and defines an opening adjacent said dampening surface to increase flexibility of said surface.

15. The gear shift assembly according to claim 14, wherein the opening defined by said dampening means defines a closed loop.

* * * * *